United States Patent [19]

Biehle

[11] Patent Number: 4,552,017
[45] Date of Patent: Nov. 12, 1985

[54] APPARATUS FOR MEASURING FLOW-RATE OF ELECTROMAGNETIC GRANULAR MEDIA

[75] Inventor: William C. Biehle, Cincinnati, Ohio

[73] Assignee: Metal Improvement Company, Inc., Teaneck, N.J.

[21] Appl. No.: 610,832

[22] Filed: May 16, 1984

Related U.S. Application Data

[63] Continuation-in-part of Ser. No. 439,917, Nov. 8, 1982, abandoned.

[51] Int. Cl.⁴ .............................................. G01F 1/58
[52] U.S. Cl. .............................. 73/198; 72/53; 73/215; 73/861.11; 222/71; 222/564
[58] Field of Search ............... 73/198, 215, 861.04, 73/861.08, 861.11; 324/204; 72/53; 222/71, 564

[56] References Cited

U.S. PATENT DOCUMENTS

| 2,781,660 | 2/1957 | Gobel | 73/215 |
| 3,433,057 | 3/1969 | Halser | 73/861.04 |
| 4,279,149 | 7/1981 | Block | 73/290 |

FOREIGN PATENT DOCUMENTS 1439199  4/1966  France .............................. 73/861.11

Primary Examiner—Herbert Goldstein

[57] ABSTRACT

An apparatus for measuring the flow-rate of ferromagnetic granular media in a gravity-fed and/or low velocity peening apparatus by passing the media in the supply line at substantially constant head pressure through an inductive transducer, wherein the current drawn by the induction coil varies in accordance with changes in the flow-rate.

15 Claims, 9 Drawing Figures

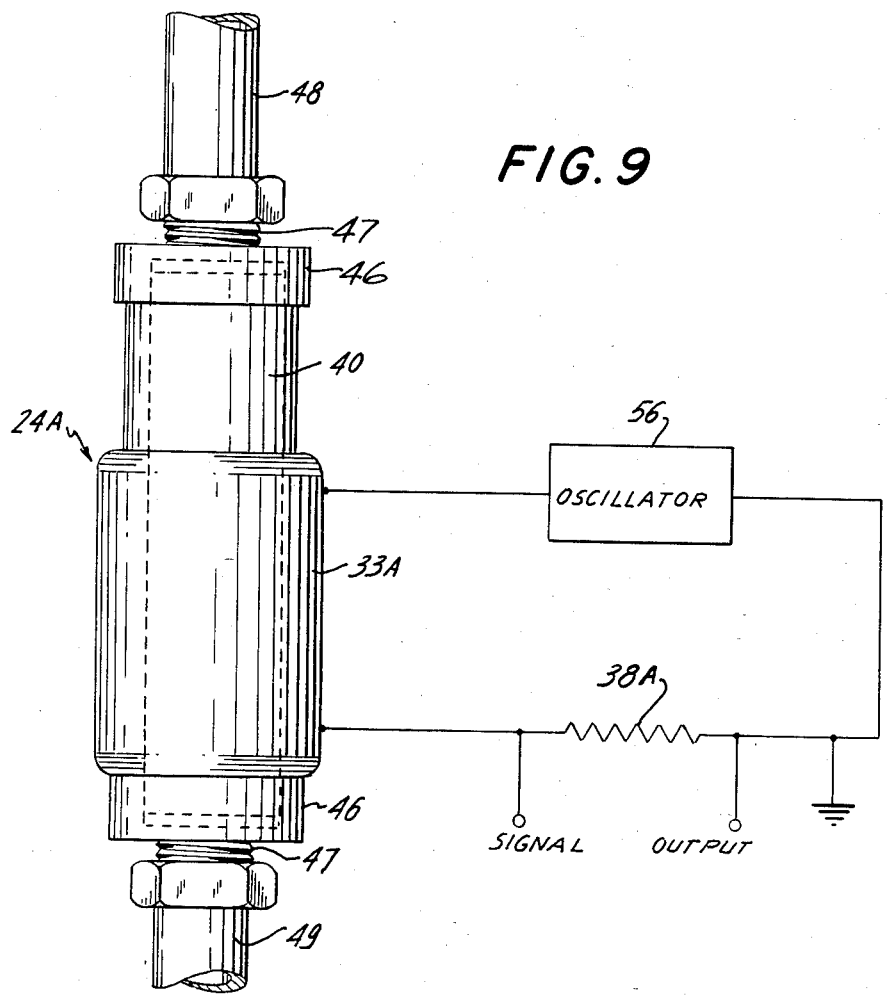

APPARATUS FOR MEASURING FLOW-RATE OF ELECTROMAGNETIC GRANULAR MEDIA

This invention relates to an improved metering device and method of measuring the flow-rate of metallic granular media, and more particularly to the flow of such media in shot-peening equipment.

This application is a continuation-in-part application of U.S. patent application Ser. No. 439,917 filed Nov. 11, 1982, now abandoned.

In prior practice, the flow of this material has commonly been measured by such means as weighing the amount of material delivered during a given period of operation of the peening equipment. This produces only an approximate result, since in a gravity fed device the flow may vary with the amount of head of the supply, and may also vary with variations in the air pressure at the delivery nozzle.

Another method of determining flow has been the use of valving means operable at different rates in the supply line, such as a cylindrical rotary valve having transverse bores in intermittent communication with the supply and delivery ports. Such a method is limited by the speed at which the valve can be rotated, and by the number of transverse bores which can be provided. The device is also expensive to fabricate, owing to the necessity of precision machining.

It is the purpose of this invention to overcome such drawbacks by means providing a substantially constant flow-rate, and electrical means for reading the rate of continuous flow.

SUMMARY

In the currently developing use of shot-peening to increase fatigue life, to increase resistance to stress corrosion, and for shaping metal parts to critical dimensions, it is desirable to have continuous indication during operation of the flow-rate of the peening media, in order that all portions of the work object may be subjected to equal treatment.

This invention provides a measuring system and equipment for constant determination of the rate of flow of granular ferro-magnetic material, such as steel shot, primarily in a low-velocity peening system with packed transfer lines. The peening unit has a continuous supply of media, gravity-fed from a hopper, which media pass through a filtering means to control head pressure, and subsequently through a metering means surrounded by a transducer coil connected to suitable current supply and to a suitable electrical readout system, whereby the flow-rate can be read on a graph plotted with the weight of shot passing through the system during any desired increment of time at the signal level produced by the system. If desired, the system may be adapted by data logger or micro processor to read directly in pounds or kilograms per minute.

In accordance with a first embodiment of the gravity-fed shot peening apparatus of this invention, the filtering element and the metering means are separate elements each of which comprise an outer tube and an inner tube disposed coaxially within the outer tube and of smaller diameter to define therebetween an annular chamber. The filtering element and metering means are interconnected so that granular media from the reservoir, e.g. a hopper, flows via suitable supply conduit, into the first inner tube of the filtering element, thence from the first inner tube, via slots therein, into the annular chamber of the filtering means. Thereafter, the shot flows into the second inner tube which forms part of the metering means and thence from the second inner tube into the annular chamber of the metering means via a plurality of spaced openings. From the last mentioned annular chamber the granular media passes from the metering means for delivery to a peening nozzle via a suitable delivery conduit.

In a second embodiment of the gravity-fed shot peening apparatus, the filtering element and metering means are combined as a single, unitary assembly. In accordance with this embodiment the filtering element and metering means have a common outer tube and their respective inner tubes are in endwise abutment so that a common annular chamber is defined therebetween. The first inner tube of the filtering element, as in the first embodiment communicates with the reservoir, e.g. a hopper, to receive granular media via a suitable supply conduit and passes the media into the common annular chamber. From the annular chamber, the granular media flows into the second inner tube of the metering means, via an elongated, tapered slot, and thence from the second inner tube, to the shot peening nozzle by way of a suitable delivery conduit.

In a third embodiment of the present invention, the common annular chamber is provided with semi-circular insert or plug so that only approximately half of the normal flow area of the annular chamber is effective to receive granular media discharging from the inner tube into the annular chamber portion or section forming part of the filtering element. This reduced flow area provides for more stable mass so that the transducer coil is more sensitive to changes in density of the mass of the granular media which is associated with changes in flow rates.

It is, therefore, an object of the invention to provide an improved method of determining the flow-rate of granular ferromagnetic material.

Another object is to provide a device for controlling head pressure from the hopper.

It is another object to provide an improved metering device for measuring continuous flow of ferromagnetic particles.

A further object of the invention is to provide a system for reading the flow-rate of ferromagnetic particles during operation of a shot-peening equipment.

Other objects and advantages will become apparent on reading the following description in connection with the accompanying drawings.

BRIEF DESCRIPTION OF THE DRAWINGS

FIG. 9 is a diagrammatic view of the electrical circuit and equipment according to another embodiment of this invention.

DESCRIPTION OF THE PREFERRED EMBODIMENTS

Figure 1:
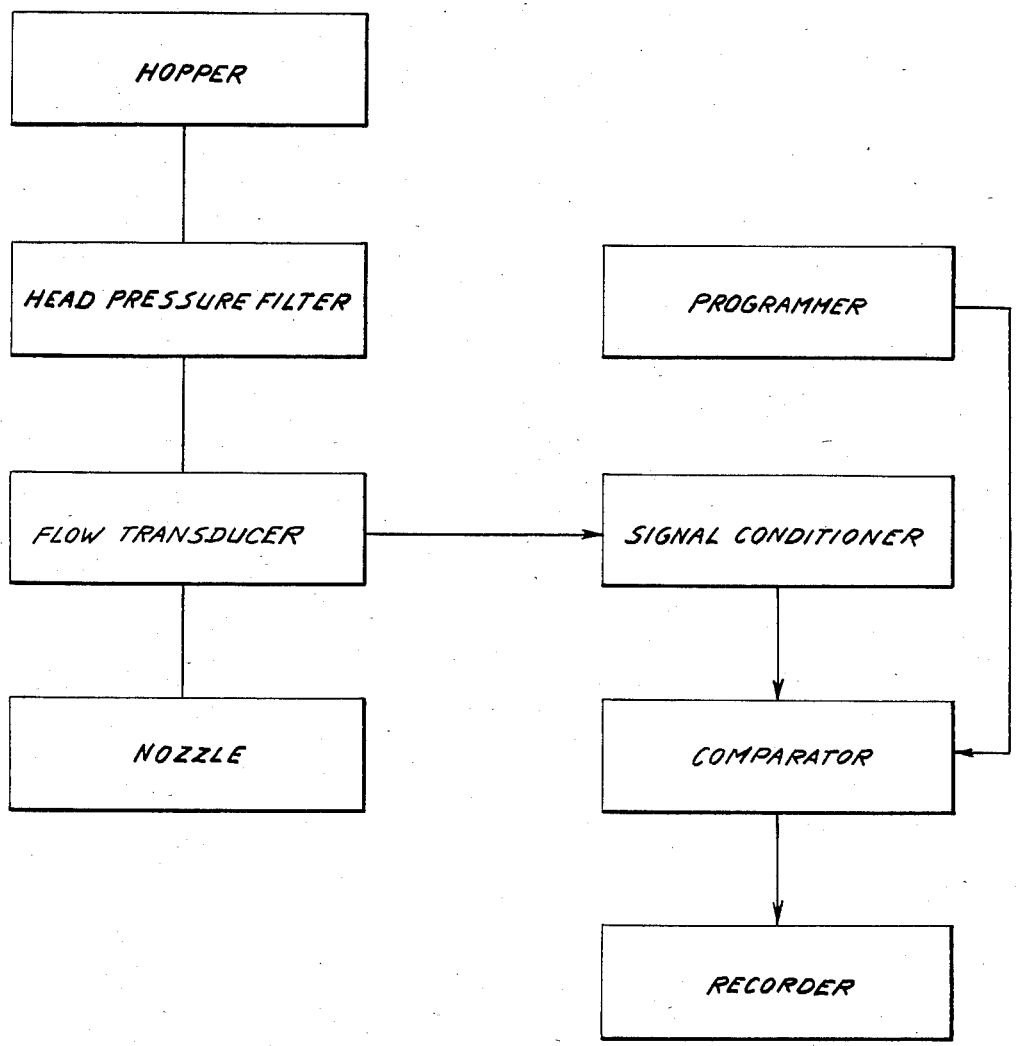
FIG. 1 is a block representation of the peening system of the invention with the associated electrical equipment.

In FIG. 1 there is shown a block representation of a shot-peening apparatus constructed according to the invention, a hopper pot, or other suitable reservoir means serves as a source of supply of ferromagnetic granular media, the hopper being constantly replenished by media which have passed through the system and are returned by any convenient means, such as a conveyor belt, for example (not shown).

The granular media, in this case steel shot of suitable size selected for the operation to be performed, pass downward by gravity, through a head pressure filter which compensates for varying head in the hopper. The shot discharges downward from the filter into an inductive flow-rate transducer which meters the rate of flow passing to the discharge nozzle and impinging on the workpiece. An electrical signal is transmitted by the transducer to a signal conditioner and ultimately to a recorder on which the signal level may be read, and then referred to the chart on which the corresponding flow-rate is plotted.

Figure 2:
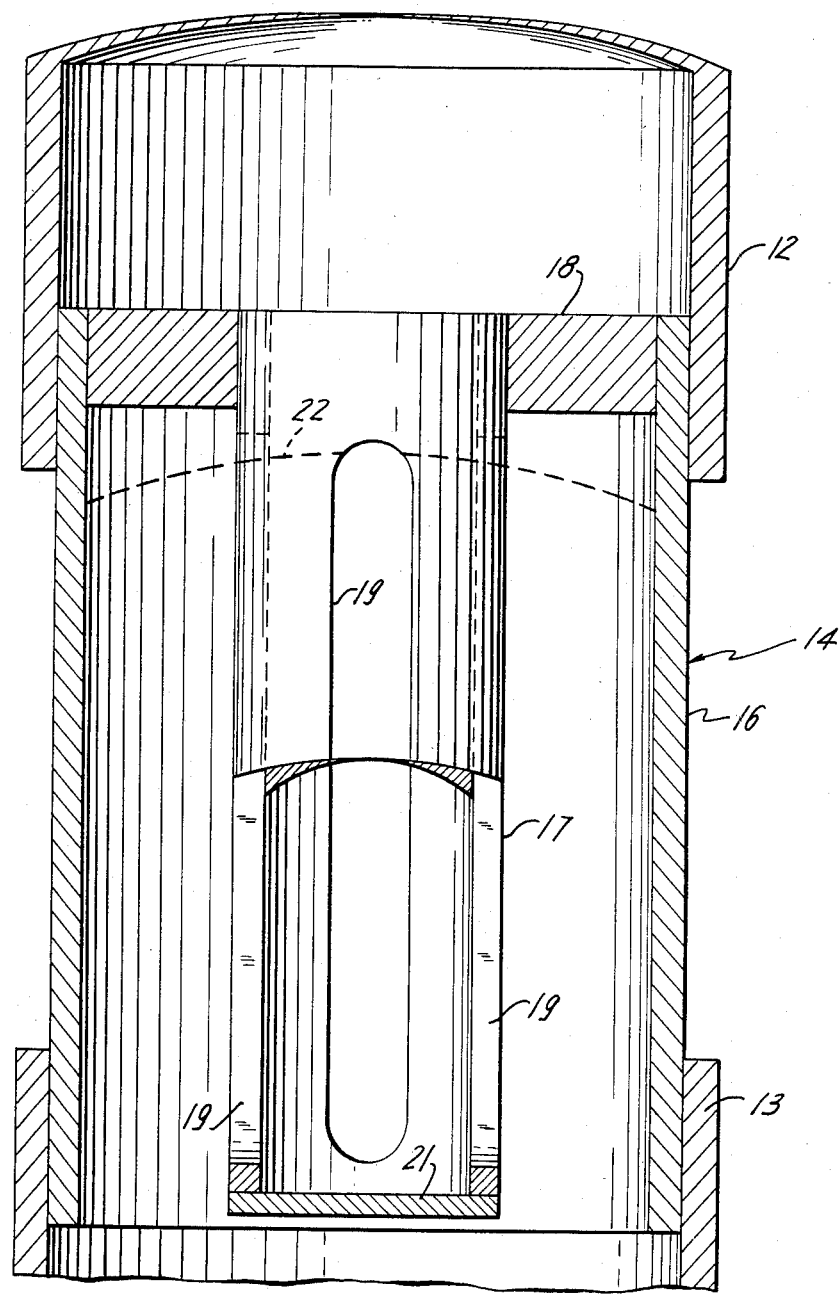
FIG. 2 is a sectional elevation of the head pressure filter which is positioned below the hopper.

FIG. 2 shows the head pressure filter 14 in cross-section. A tube or sleeve 12 connects the hopper (not shown) to the filter and serves as a transfer line to feed the granular media to the filter. A second tube 13 extends downward from the filter and passes the media to the transducer which serves as a metering device. All tubes and partitions in this embodiment were formed of polyvinyl chloride plastic, cemented together to form a continuous passage or transfer line, but other substances will serve.

The filter 14 comprises a chamber formed of an outer tube 16 with a smaller concentrically disposed inner tube 17, the upper end of tube 16 having a closure plate 18 with an axial bore therethrough in which the inner tube 17 is mounted and provides communication with the interior of sleeve 12. The wall of the central tube 17 has a plurality of ports or vertical slots 19 therethrough for the passage of shot, the head pressure being rendered substantially constant by the controlling slots 19. As shown, there are four such slots disposed 90° apart, but a greater or lesser number symmetrically disposed are serviceable. The bottom end of tube 17 is provided with a closure 21 so that shot entering the open top end must discharge transversely through the slots into the annular chamber surrounding tube 17. The dotted line 22 shows approximately the level to which the filter would be filled with shot. It has been found convenient to use an outer tube having twice the inner diameter of that of the inner tube, but this is not a critical ratio. Shot from the annular chamber passes on into the transfer line through the open lower end of tube 16.

Figure 3:
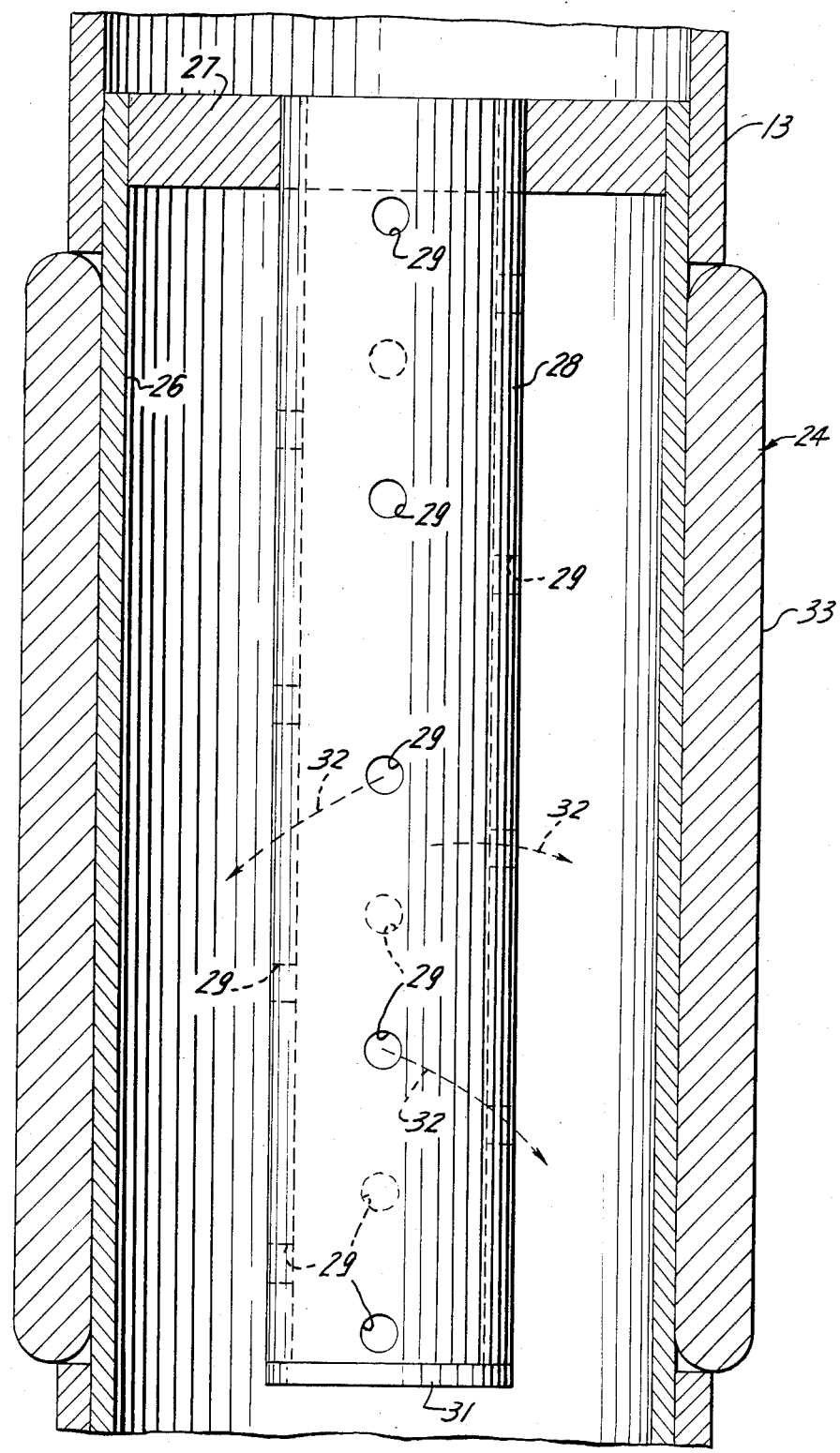
FIG. 3 is a sectional elevation on a transducer flow-meter which is positioned below the filter.

In FIG. 3, there is shown the metering device 24, disposed a short distance downstream from the head pressure filter and in communication therewith through sleeve 13. In general form, the meter 24 is similar to the filter but is of different function. It comprises an outer tube 26 having at its top end a closure 27 having an axial bore therethrough, with an inner tube 28 mounted therein and communicating with the filter through sleeve 13.

Tube 28 has a plurality of bores 29 through the wall, disposed in four vertical rows 90° apart and providing communication between the interior of tube 28 and the annular chamber surrounding it. A closure 31 is provided at the downstream end of tube 28, so that media entering the top end discharge transversely through bores 29, as indicated by the dotted arrows 32. The bores are staggered so that no two bores are in the same transverse plane to provide substantially uniform shot-flow into the annular chamber between the two tubes, and the diameter of the bores is chosen appropriately for the size of shot to be used. In the embodiment shown, the shot used was of 0.011" diameter and the bores of 11/32" diameter, but this is not a fixed ratio. Appropriate proportions would be chosen from such considerations as maximum flow rate desired, overall physical size of the equipment, and the degree of resolution desired.

As in the case of the filter, a convenient proportion for the tubes of the transducer is an outer tube 26 having an inner diameter twice the inner diameter of tube 28.

Figure 4:
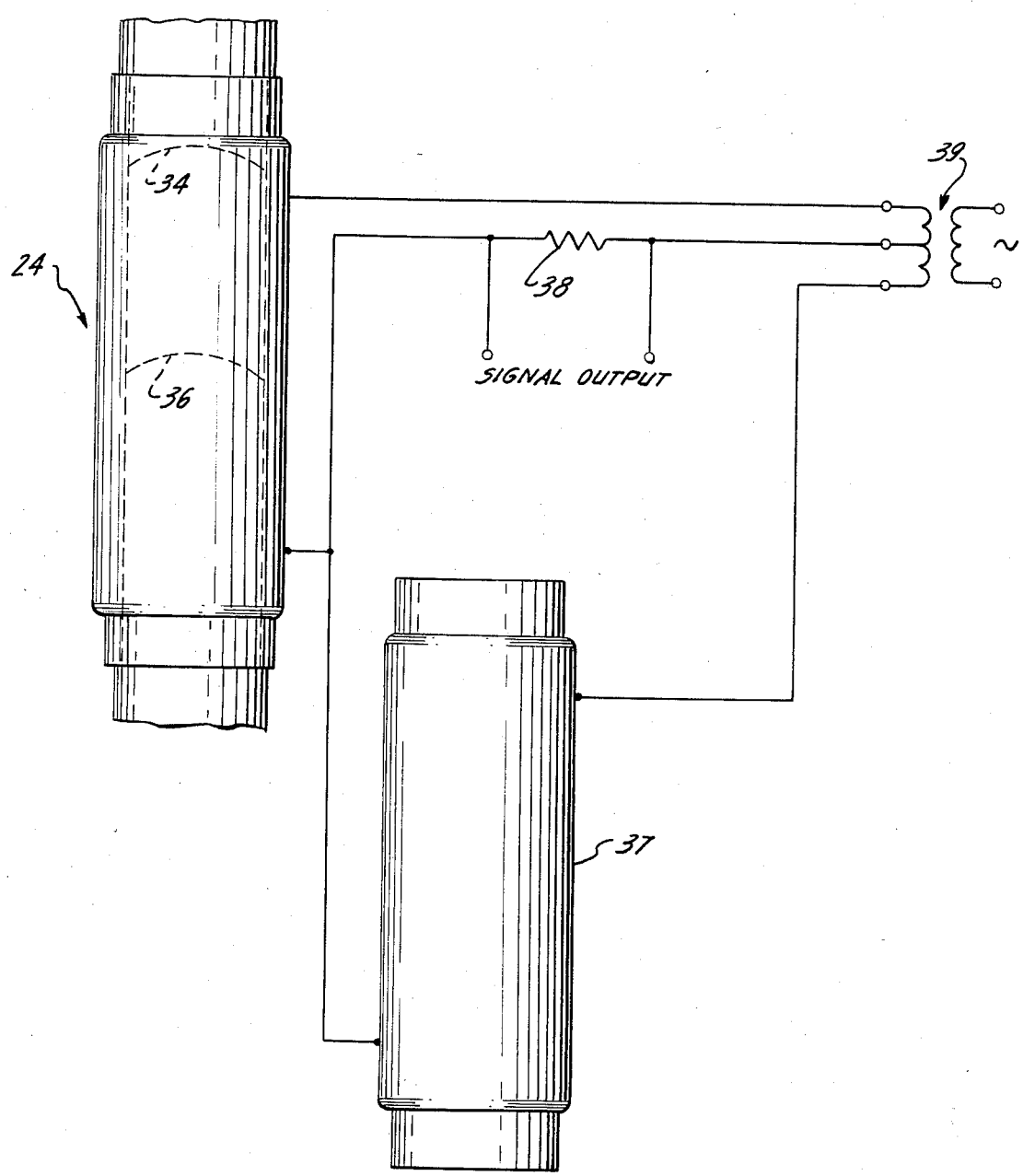
FIG. 4 is an elevation of the transducer with associated electrical equipment.

An induction coil 33 surrounds the outer tube 26 of the flow meter and is provided with current as shown schematically in FIG. 4. A range of 1 to 10 volts at 60 hz is a suitable operating voltage, with 3 to 4 volts being preferred. There is no appreciable magnetic effect on the shot up to about 8 volts.

With appropriate electrical equipment much higher frequencies may be used, from 1 to 100 Khz, which allows low current.

When the transducer is in a static condition, as at startup, it will be practically full of shot, as indicated by the dotted line 34 in FIG. 4. As an example, in the full condition the coil 33 of meter 24 may draw approximately 100 milliamperes at 4 volts at 60 cycles. As the shot-loading drops, the current drawn increases proportionately, to the normal working shot-level indicated generally by the dotted line 36 of FIG. 4. With no shot in the system, full saturation is reached and the current drawn may be as high as 200 milliamperes or more. It is to be understood that this is an example only, depending on the characteristics of the coil used, and is not a limitation of the invention.

FIG. 4 also shows an option which may be used. In addition to the working coil 24 through which the shot passes to the nozzle, there may be provided a balancing coil 37 in the circuit which is of the same form and size as the working coil but which has closed ends and is filled with shot. The balancing coil, if used, will boost the usable signal; it creates a null effect in the static condition, resulting in a greater change of current drawn from the static to dynamic condition, when used with the center tap transformer 39. Such larger range of current permits more precise calibration of the signal output in relation to the flow rate.

The balancing coil 37 is a static coil as shown in FIG. 4, but a second coil 24 may be used dynamically in series with the first coil 24, receiving the shot from the first coil and passing it along the supply line to the nozzle. However, the same result may be achieved more simply by merely increasing the length of the transducer coil.

The principle of operation of the flow-rate transducer is that when the current drawn by the coil is applied to the load resistor 38, Ohm's law, $E = I \times R$, applies. R being a constant, as the current increases, the voltage will increase proportionately. The signal voltage across the resistor 38 provides a voltage signal input to the signal conditioner (FIG. 1). The signal output of the transducer thus produces a change related to the change of level of shot as the flow-rate changes. Hence, flow-rate may be read directly on the recorder.

Figure 5:
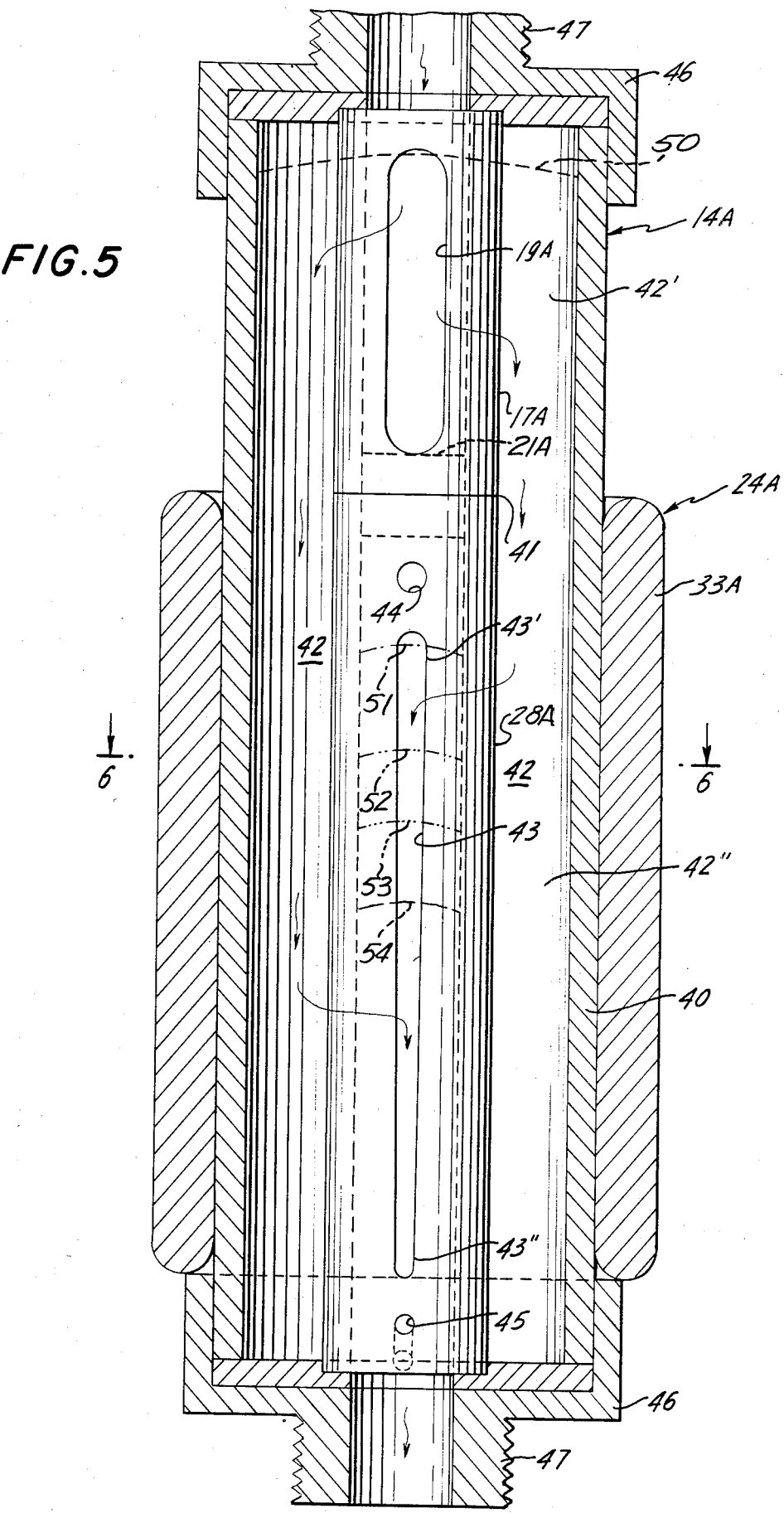
FIG. 5 is a longitudinal, cross-sectional view of the head pressure filter and metering device unitary assembly in accordance with a second embodiment of this invention.
Figure 6:
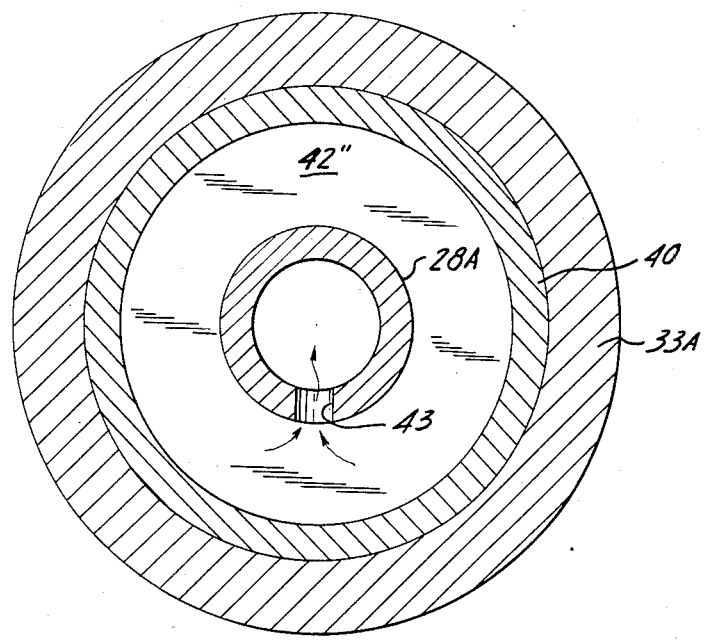
FIG. 6 is a transverse cross-sectional view taken along line 6—6 of FIG. 5.

In FIGS. 5, 6 and 9 is shown a gravity fed shot peening apparatus in accordance with a second embodiment of this invention. It differs generally from the first embodiment previously described herein and shown in FIGS. 1 to 4, inclusive, in that the head pressure filter and the metering device are combined in a single unitary structure, whereas the first embodiment discloses the head pressure filter and the metering device as separate and distinct assemblies, albeit interconnected. Another difference of this second embodiment from that of FIGS. 1 to 4, is that the inner tube of the metering device has a single, elongated, tapered slot instead of the plurality of bores 29 in inner tube 28 of metering device 24 and functions to a relatively more stable mass of shot particles than in the first embodiment. A still further difference resides in a simplified electrical equipment in which a balancing coil 37 shown in FIG. 4 is omitted. In view of the similarity between the first embodiment shown in FIGS. 1 to 4 and the second embodiment shown in FIGS. 5, 6 and 9, the reference numbers of the first embodiment will be used to identify like parts of the second embodiment illustrated in FIGS. 5, 6 and 9, but with the suffix A added thereto.

In FIGS. 5 and 6 the head pressure filter 14A and metering device 24A have a common outer tube 40 within which are coaxially disposed inner tubes 17A and 28A of pressure filter 14A and metering device 24A, respectively. The inner tubes 17A and 28A are in endwise abutment at 41 and define with the outer tube 40 a common annular chamber 42 which has an upper section 42' and a lower section 42" associated, respectively, with pressure filter 14A and metering device 24A. The inner tube 17A is closed at its bottom end by a wall or plug 21A and has a plurality of elongated slots 19A, similar to slots 19 of inner tube 17, which serve the same function, namely to pass granular media or shot particles from the interior of inner tube 17A into annular chamber section 42' as is shown by the arrows. Similar to metering device 24 shown in FIG. 3, an induction coil 33A surrounds outer tube 40 adjacent the lower section 42" of common annular chamber 42. The inner tube 28A of metering device 24A has a single, longitudinally extending slot 43 in its wall instead of the plurality of spaced bores 29 in the inner tube of the previously described embodiment. The slot 43 extends substantially the length of inner tube 28A and tapers from a maximum width at its top end portion 43' to its narrowest width at its bottom end portion 43". The varying flow area of slot 43, functions to provide control of the flow of shot particles, from annular chamber section 42' into the interior of the inner tube, as is shown by the arrows, which flow varies with the change in shot particle levels to thereby provide for an output signal from coil 33A which linearly changes with the change in flow rate of the shot particles. An opening, 44 is also provided in the upper end of inner tube 28A which functions to fill the interior of inner tube 28A provides a relatively stable electrical signal during this condition. An opening 45 is also provided in the lower end of inner tube 28A which opening functions to drain the annular chamber 42 of shot particles when it is desired to shut-down the apparatus for inspection or repair purposes.

The opening 45 also provides under low rates of flow a more uniform density of shot particles than would be attainable without such an opening. This uniformity in density is achieved by opening 45 functioning to maintain fluidization and thereby prevention of compaction of the shot particles. Since the bypass of shot particles through opening 45 is uniform and constant, the electronic measuring circuit can be calibrated to account for this bypass flow and thus provide an accurate means of flow rate.

The opposite ends of outer tube 40 are closed by end caps 46 which are suitably secured to outer tube 40. Each end cap 46 has a threaded, axial extension 47 for connecting the entire unitary head pressure-metering device assembly to a supply pipe 48 and a delivery pipe 49 (see FIG. 9). As shown in FIG. 5, each of the end-caps 47 have a central bore which is coaxial with and communicates with the interior of the associated inner tubes 17A and 28A so that steel shot or other electromagnetic granular media flows from supply pipe 48 into inner tube 17A and passes from inner tube 28A into delivery pipe 49.

In operation of head pressure filter and metering device assembly herein described and shown in FIGS. 5 and 6, the granular material, e.g. steel shot, passes continuously from a source of supply of such material, through supply pipe 48, into the interior of inner tube 17A and thence, through slots 19A, into chamber section 42' of common chamber 42. The flow of granular material (hereinafter "steel shot") is provided by gravity or under a low pneumatic pressure or a combination of both. The steel shot then passes into chamber section 42" of common chamber 42 and into the interior of inner tube 28A via slot 43. From the interior of inner tube 28A, the steel shot flows into delivery pipe 49 and to a shot peening nozzle (not shown) for discharge of the steel shot against a workpiece (not shown) for the surface treatment of the latter.

Under a no-flow condition, the level of steel shot in common chamber 42 is at about a level indicated by the broken line 50 while the level in inner tube 28A is at about the level indicated by the dot-dash line 51. Under a low flow rate, the level in chamber 42 drops slightly while the level of steel shot in inner tube 28A drops to approximately the level indicated at the dash-double dotted line 52. The levels of steel shot in inner tube 28A continues to drop as the flow rate continues to increase. Such decreased levels are depicted by the dash-triple dotted line 53 and the dashed line 54. At maximum flow rate the level of steel shot in inner tube 28A is approximately at the level shown by broken line 54. These changes in the level of steel shot is sensed by the coil 33A in terms of the mass or density of the steel shot, thus providing a variable signal voltage across a resistor 38A (see FIG. 9).

In FIG. 9, the head pressure filter and metering device assembly shown in FIGS. 5 and 6 utilizes an electrical circuit which has as oscillator in place of the transformer 39 and has eliminated balancing coil 33 of the circuit shown in FIG. 4. In view of the similarity of the circuits shown in FIGS. 4 and 9, the components of the circuit of FIG. 9 will be designated by the same numbers but with the suffix A added thereto.

The circuit as shown in FIG. 9 comprises the coil 33A, an oscillator 56 and a load resistor 38A, all connected together in series. The oscillator 56 provides the source of electric current. With both voltage and current in substantial phase, the circuitry measures more accurately flow rate in terms of linear change in the metering device 24A. This circuit may be operated at 7.7 Khz and 6 volts.

Figure 8:
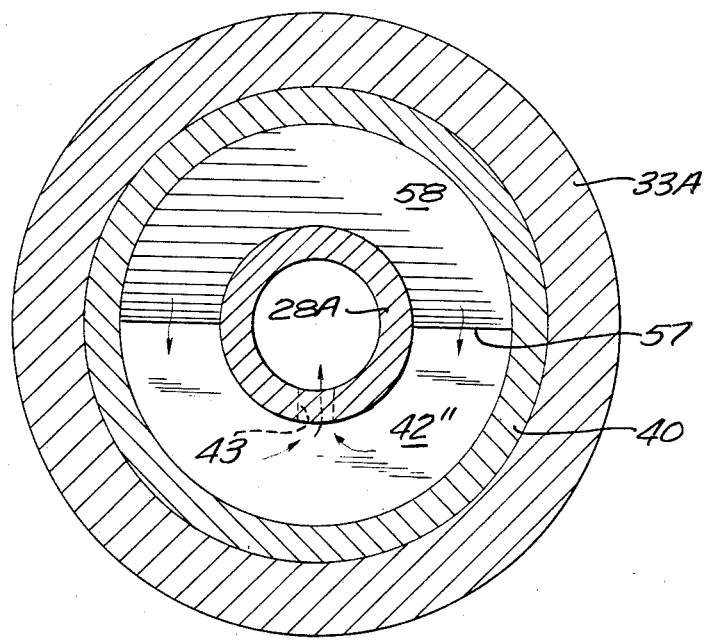
FIG. 8 is a transverse cross-sectional view taken substantially along line 8—8 of FIG. 7.
Figure 7:
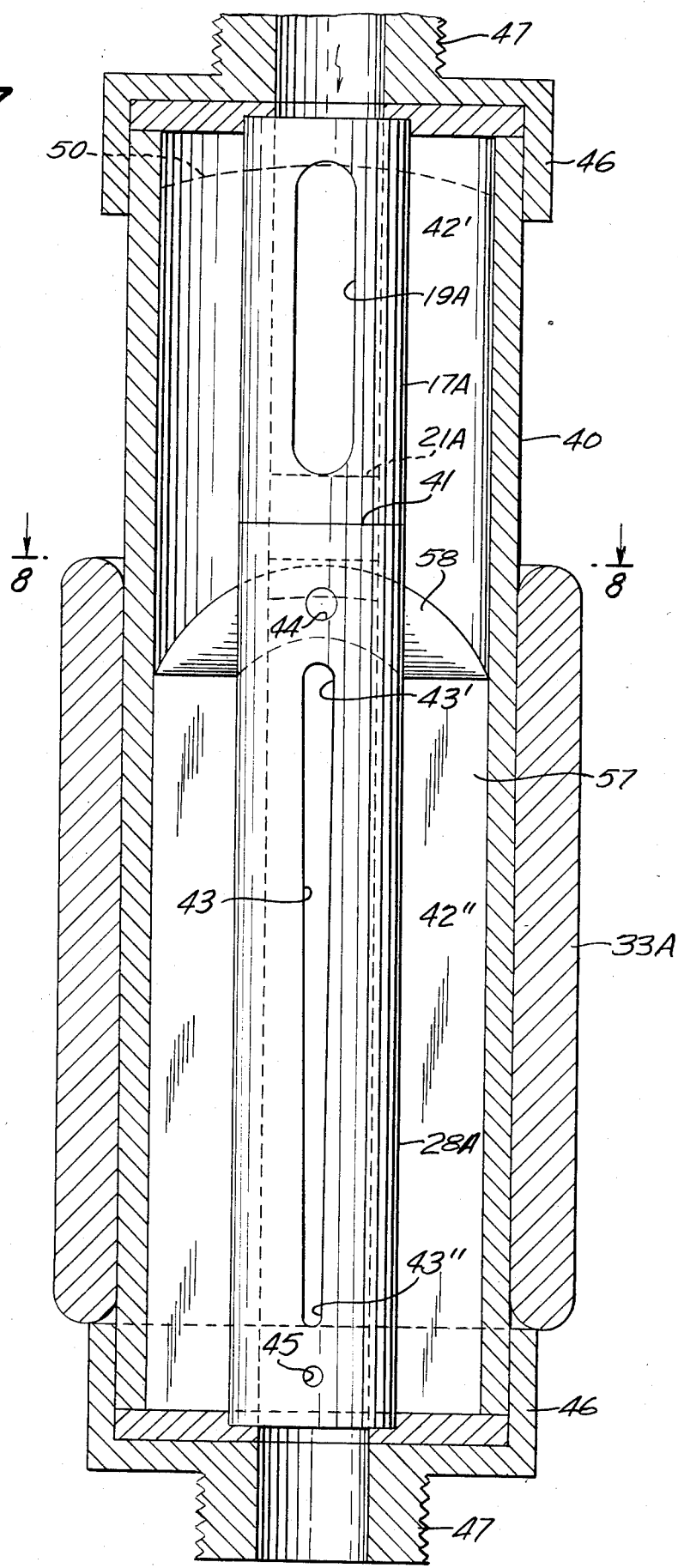
FIG. 7 is a cross-sectional view of the head pressure filter and metering device unitary assembly in accordance with a third embodiment of this invention.

In FIGS. 7 and 8 is shown a third embodiment of this invention wherein the head pressure filter-metering device assembly shown in FIGS. 5 and 6 is only modified by having the volume of common chamber 42 substantially reduced. Since the assemblies of FIGS. 5 and 6 and of FIGS. 7 and 8 are identical except for the aforementioned difference, the parts of the assembly of FIGS. 7 and 8 corresponding to the parts of assembly of FIGS. 5 and 6 will be identified by the same reference numbers.

In FIGS. 7 and 8 the reduction in volume of chamber 42 of the assembly is clearly shown as accomplished by a semi-circular insert or plug 57 preferably of ferromagnetic material, which is dimensioned in radius and length to snugly fit within the annular space of chamber section 42". It is positioned diametrically opposite slot 43 of inner tube 28A. The plug 57 is so formed that its upper end surface 58 lies in a plane canted with respect to a transverse, horizontal plane through inner tube 28A. This sloping upper surface prevents steel shot from accumulating thereon and minimizes the resistance to the flow of steel shot from chamber section 42' to chamber section 42". The plug 57 functions to provide a fixed and stable mass in the metering device 24A so that density variations of the shot particles which occur in the remaining effective part of chamber section 42" are sensed and measured by the electronic equipment shown in FIG. 9 over a narrower voltage range and is thus more sensitive to changes in the density of the shot particles. In addition, the use of plug 57 reduces the amount of electric current required and thus makes the system more economical to operate and reduces the possibility of error due to heat.

The embodiments of this invention have been described as utilizing gravity for the feed of granular media, e.g. steel shot, but it is to be understood that the invention is not to be limited thereto and that the granular media may be fed at low velocity under low pneumatic pressure as exemplified in the United States patent to Feld et al U.S. Pat. No. 4,365,493 without departure from the scope and spirit of this invention. It is also to be understood that surface 58 of plug 57 may be a spirally generated surface without departing from the scope and spirit of this invention.

What is claimed is:

1. Gravity-fed and/or low velocity peening apparatus comprising in combination:
   (a) reservoir means supplying ferromagnetic granular media disposed at a suitable elevation to provide head pressure for the media;
   (b) filter means disposed below and downstream from the reservoir and communicating therewith to receive the media therefrom and having means stabilizing the flow-rate of the media to provide substantially constant head pressure below the filter means;
   (c) metering means disposed below and downstream from the filter means and communicating therewith to receive the media from the filter, said metering means including means for providing a level of media indicative of flow rate therethrough, and having electrical inductive means responsive to the level of media in the metering means and producing an electrical signal responsive to such level; and
   (d) nozzle means disposed downstream from the metering means and receiving the media therefrom and discharging the media to a workpiece.

2. The combination recited in claim 1, wherein the filter means comprises a vertically disposed outer tubular member closed at the upper end and open at the lower end, an inner tubular member coaxial therewith open at its upper end and closed at the lower end and defining an annular chamber with the outer tube, the inner tube receiving the media through the open upper end and having a plurality of apertures through the tubular wall stabilizing the flow of media therethrough into the annular chamber to provide substantially constant head pressure downstream therefrom.

3. The combination recited in claim 2, wherein the apertures stabilizing the flow of media are a plurality of equidistantly disposed vertical slots through the inner tube wall.

4. The combination recited in claim 2, wherein the metering means comprises a vertically disposed outer tubular member closed at the upper end and open at the lower end, an inner tubular member coaxial therewith open at the upper end and closed at the lower end and defining an annular chamber with the outer tube, the inner tube receiving the media from the filter through the open upper end and having a plurality of apertures through the tubular wall restricting the flow of media therethrough into the annular chamber, a transfer line communicating with the lower end of the annular chamber and with a discharge nozzle disposed downstream therefrom, an electrical induction coil disposed around the exterior of the annular chamber and coaxial therewith, electrical supply means activating the induction coil, the activated coil being responsive to the level of media within the chamber of the metering means and providing an electrical signal varying in accordance with changes in the media level.

5. The combination recited in claim 4, wherein the apertures through the inner tube wall are a plurality of circular bores disposed in a plurality of vertical rows equidistantly spaced, the rows being vertically staggered in relation to each other so that no two bores are in the same transverse plane.

6. The combination recited in claim 4, wherein the electrical current drawn by the induction coil is at a minimum when the annular chamber is substantially full of ferromagnetic granular media, the current rising in inverse proportion to a drop in the level of the media in the chamber.

7. The combination recited in claim 1 wherein said filter means comprises a vertically disposed first inner hollow tubular member and the metering means comprises a vertically disposed second inner hollow tubular member in endwise coaxial abutment with said first inner tubular member, wall means for maintaining the interior of the first and second inner tubular members out of communication with each other, a common outer tubular member of larger diametral size than said first and second inner tubular members being disposed in coaxial relationship with the said first and second inner tubular members so as to form between the latter members and the outer tubular member a chamber, closure means for closing the opposite ends of said chamber, first passage means in said closure means for communicating said first inner tubular member with said reservoir means to pass media from the latter to said inner first tubular member, a first port means in said first inner tubular member to pass media from its interior into said chamber, a second passage means in said closure means for communicating said second inner tubular member with said nozzle means to pass media from the interior of said second inner tubular member to said nozzle means, and a second port means in said second inner tubular member for passing media from the chamber into the interior of said second inner tubular member.

8. The combination of claim 7 wherein said second port means of said second inner hollow tubular member is a single, elongated slot extending parallel to the longitudinal axis of the second inner tubular member and for a substantial length thereof.

9. The combination of claim 8 wherein said slot is tapered so as to provide a maximum flow area adjacent the upper end portion of said second inner tubular member to a minimum flow are a adjacent the lower end portion of said second inner tubular member.

10. The apparatus of claim 7 wherein a drain opening is provided in the lower end portion of said second inner tubular member to pass media from the chamber into the interior of said second inner tubular member.

11. The apparatus of claim 8 wherein plug means is provided in said chamber to substantially reduce the volumetric dimensions of said chamber.

12. The apparatus of claim 11 wherein said plug means is semicircular in cross-section and radially dimensioned to fit within the chamber and extending longitudinally coextensively with said slot and disposed substantially diametrically opposite from said slot in said second inner tubular member.

13. The apparatus of claim 12 wherein the upper end surface of said plug means is inclined downwardly to conduct media into the reduced volume portion of said chamber with minimal resistance to such media flow in said chamber.

14. The apparatus of claim 12 wherein the upper end surface of said plug means is inclined in a plane canted with respect to a horizontal plane to deflect media into the reduced volume portion of said chamber with minimal resistance to such flow in said chamber.

15. The apparatus of claim 11 wherein said plug is of ferromagnetic material.

* * * * *